United States Patent [19]

Liu

[11] 4,384,306

[45] May 17, 1983

[54] VARIABLE PEAKING CONTROL CIRCUIT

[75] Inventor: Frank C. Liu, Phoenix, Ariz.

[73] Assignee: RCA Corporation, New York, N.Y.

[21] Appl. No.: 276,010

[22] Filed: Jun. 22, 1981

[51] Int. Cl.³ .................................................. H04N 5/14
[52] U.S. Cl. ................................................... 358/166
[58] Field of Search ...................... 358/36, 37, 38, 160, 358/162, 166, 167, 904

[56] References Cited

U.S. PATENT DOCUMENTS

| | | | |
|---|---|---|---|
| 2,996,576 | 8/1961 | Dolby | 178/6.6 |
| 3,919,714 | 11/1975 | Bingham | 358/38 |
| 3,984,631 | 10/1976 | Avicola | 178/7.3 |
| 4,041,531 | 8/1977 | Bingham | 358/37 |
| 4,081,836 | 3/1978 | Skinner | 358/166 |
| 4,090,217 | 3/1978 | Goyal et al. | 358/37 |
| 4,122,489 | 10/1978 | Bolger et al. | 358/21 |
| 4,189,755 | 2/1980 | Balbes | 358/904 |
| 4,263,616 | 4/1981 | Lee | 358/166 |
| 4,268,855 | 5/1981 | Takahashi et al. | 358/167 X |
| 4,272,785 | 6/1981 | Fuhrer | 358/127 |

FOREIGN PATENT DOCUMENTS 52-24029  2/1977  Japan ................................. 358/167

Primary Examiner—Robert L. Richardson
Attorney, Agent, or Firm—E. M. Whitacre; J. S. Tripoli; E. P. Herrmann

[57] ABSTRACT

A video signal processing circuit including signal substitution circuitry for eliminating impulse noise has a signal peaking circuit conditionally operable for the duration of one or more video fields depending upon the presence of noise being detected in the vertical blanking interval. A circuit responsive to enabling pulses generated as a result of impulse noise or defects being detected in a vertical blanking interval provides one of two peaking control signals for controlling the level of peaking applied to the video signal by the peaking circuit.

7 Claims, 4 Drawing Figures

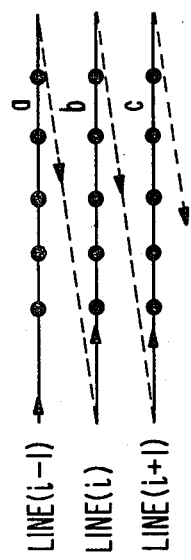
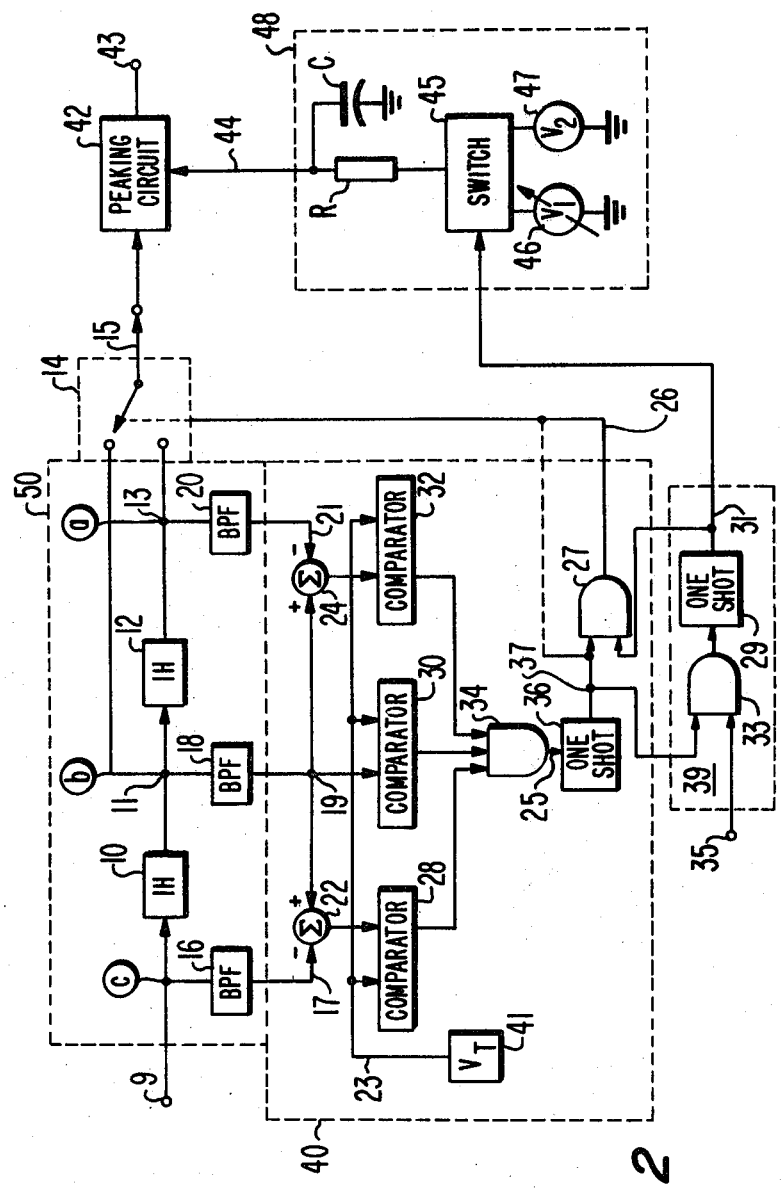

VARIABLE PEAKING CONTROL CIRCUIT

BACKGROUND OF THE INVENTION

The present invention relates to television receiver circuitry and more particularly to circuitry for reducing objectionable display effects due to the occurrence of noise in the video signal. A circuit is described for substituting delayed signal for noisy signal and simultaneously effectively reducing signal bandwidth when noise is present in the signal.

Defects or noise in television image information signals produce objectionable picture characteristics in the reproduced image in the form of bright or dark lines or spots or spots of varying color. In broadcast TV signals these defects arise from RF interference which impose noise impulses on the transmitted signals. A familiar manifestation of such noise are the bright flashes which occur on the TV display when an electric motor such as a hair dryer is operated in the vicinity of a TV receiver. With respect to video signal recovered from a recorded medium, e.g., playback of a VTR or a video disc, defects arise from loss of portions of the recorded signal due to defects in the record. These defects are referred to in the recording arts as dropouts and produce streaks in the displayed picture. Whether the defects arise from noise or dropouts they are susceptible of detection prior to display of the image so that corrective action may be taken to reduce objectionable manifestations.

Television image information is generally redundant line to line. It is therefore possible to substitute segments of signal from adjacent image lines in place of defective signal segments. Known defect compensators of this type, as shown in U.S. Pat. No. 2,996,576, store image information from a previous line and insert the stored previous line of information, or a portion thereof, into the video signal when a signal defect occurs. See also U.S. Pat. No. 4,122,489, "Signal Defect Compensator," Bolger et al.

It has been found to be advantageous to perform such signal substitution only if the signal is determined to be generally noisy. This may be accomplished by testing for the presence of noise during the vertical blanking interval and enabling the substitution circuitry for a preset number of successive fields or frames following the detection of noise in a vertical interval.

In order to enhance picture sharpness TV receivers frequently incorporate peaking circuitry to enhance higher frequency signal transactions. Unfortunately the peaking circuits also enhance noise components. Therefore it is desirable to defeat or reduce the effects of the peaking circuits in the presence of noise, see for example U.S. Pat. No. 4,081,836.

SUMMARY OF THE INVENTION

The present inventor has configured a noise reduction circuit including a signal substitution means and a peaking circuit cooperating therewith. The signal substitution circuit is enabled to operate only when a noisy signal environment is detected. A peaking circuit serially connected to the output of the substitution circuit is controlled to operate between a preset peaking level in a noisy signal environment and a manually controlled peaking level in the absence of noise.

BRIEF DESCRIPTION OF THE DRAWINGS

FIG. 1 is a graphic illustration of the spatial relationship of picture points in successive TV lines reproduced in the displayed picture;

FIG. 2 is a block diagram of a video signal substitution circuit and peaking circuit embodying the present invention;

Figure 3:
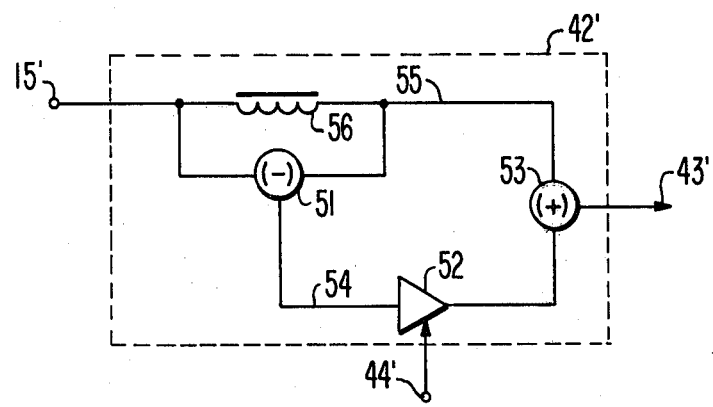
FIG. 3 is a schematic diagram of a voltage controlled video signal peaking circuit.

The current invention is a peaking circuit incorporated with circuitry for detecting noise in baseband video signal, circuitry for substituting segments of delayed video signal for noisy video signal and circuitry for generating a control signal to enable the substitution circuitry to operate for prescribed intervals only when the presence of noise above a certain threshold in the video signal is detected. The peaking circuit is serially connected to the output connection of the signal substitution circuit and is selectively conditioned to provide one of two levels of peaking responsive to the control signal.

The level of signal peaking applied to the video signal in the absence of noise, is manually determined by the user according to his preference or taste via a potentiometer provided for such adjustment. On the other hand when the signal is determined to be noisy the peaking circuit control signal is switched to a present level which reduces the amount of peaking typically selected in accordance with the threshold level of the noise detector.

It should be appreciated that the substitution circuit cannot eliminate one hundred percent of the noise. The noise detected is a function of the sensitivity of the noise detector. In effect the noise detector is set to detect noise above a particular threshold to limit possible false detection. The present inventor has found that even though the threshold noise level may be established at a relatively low noise amplitude, that noise level may be considerably higher than the noise level typically present in a non-noisy environment. In other words, for video signal which has been determined to be noisy by the presence of a detectable or high level noise pulse, the average amplitude and/or the frequency of occurrence of undetectable or low level noise pulses is greater than the average amplitude and/or the frequency of occurrence of undetectable noise pulses in video signal considered to be non-noisy. In addition very narrow noise pulses may not be "seen" by the noise detector. Thus it is desirable to reduce signal peaking whenever the substitution circuit is conditioned to be operable by the presence of noise.

The invention will be discussed in terms of baseband signal but it should be appreciated that impulse or other noise may be detected in the modulated picture carrier. At baseband the noise in the video signal is somewhat band limited and has a ringing characteristic. The ringing aspect of the noise in the baseband video signal facilitates noise detection by obviating detection of both positive and negative noise signal excursions.

Noise detection is performed by comparing the signal levels of successive vertical picture points. The signal from three successive horizontal lines are brought into temporal coincidence by successively delaying the video signal by 1 H and 2 H time periods. It will be presumed that the signal delay elements are of the charge transfer device type and that the signal will be rendered to sampled data format, i.e., the signal is not a smoothly varying signal but rather a signal having constant amplitude values over each sampling period, each amplitude value corresponding to the amplitude of the signal being sampled at the particular sampling interval. The delayed signal can therefore be considered as a plurality of discrete signal points. Consider the signal representation shown in FIG. 1. Corresponding portions of three image lines are shown with the dots indicating the sampling points. Line (i) is presumed to be the current horizontal line being displayed. Line (i−1) is a horizontal line previously displayed and line (i+1) is the next successive horizontal or image line to be reproduced. The dots designated a, b, c are three successive picture points located on a vertical line in the reproduced picture.

In normal TV signals there is a high degree of vertical redundancy. This implies that the signal amplitude value at point b will be similar to that at points a and c or if a horizontal edge is present in the picture the amplitude of point b should be similar to the amplitude of at least one of the points a or c. Remember that in the absence of noise it is very unlikely that the amplitude at b will vary significantly from the amplitude at a and c.

Assume that when two horizontal lines are substantially redundant the amplitude of adjacent vertical points will not differ by more than some value $\Delta R$. Then if lines (i−1) and (i) are redundant, $$|b-a| \leq \Delta R$$

similarly if lines (i) and (i+1) are redundant $$|b-c| \leq \Delta R$$

where a, b and c represent the amplitude of the respective signals at points a, b and c. When a horizontal edge occurs signals a and b will be greater in amplitude than signal c, or signals b and c will be greater than signal a. In the first case $|b-a| \leq \Delta R$ and $|b-c| \geq \Delta R$ and in the second case $|b-a| \geq \Delta R$ and $|b-c| \leq \Delta R$. On the other hand if an impulse noise condition causes b to be greater than both a and c then both $|b-a| \geq \Delta R$ and $|b-c| \geq \Delta R$ and this is the condition for impulse noise detection.

The impulse noise detection system subtracts, point-by-point line (i−1) from line (i) and line (i+1) from line (i). The results of these subtractions are compared with a threshold signal which is sufficiently greater than $\Delta R$ to insure a margin against false noise detection. When the result of both subtractions are simultaneously greater than the threshold signal a control signal is generated to perform noise compensation.

FIG. 2 includes circuitry for performing impulse noise detection as described. In FIG. 2 the circuitry circumscribed by the broken line 40 performs the line-to-line signal comparison. The circuitry circumscribed by the broken line 50 aligns three successive lines of video signal in the requisite temporal relationship so that corresponding vertical picture points are simultaneously available for comparison by circuitry 40. In addition, there is a switch 14, responsive to a control signal, generated by circuitry 40, on connection 26 for substituting delayed signal for signal containing noise. A peaking circuit 42 receives video signal from terminal 15 and enhances the amplitude response of a selected range of signal frequency components. Peaking circuit 42 is conditioned to operate at one of two peaking levels by selective application of one of two peaking control signals generated in circuit 48. A further circuit 39 which determines if noise is present in selected composite video periods, e.g., vertical or horizontal blanking intervals, controls the operation of circuit 48 and enables or disables the noise detector output signal controlling switch 14.

Demodulated baseband video signal is applied at terminal 9, which signal is delayed one horizontal line period by the delay line 10 and is made available at connection 11. The delayed signal is applied to the second delay line 12 in which it is delayed a second horizontal line period before being available at connection 13. In the absence of impulse noise in the signal at connection 11, the signal delayed one horizontal line period is applied via switch 14 to terminal 15 from which point it is further processed for display on the receiver kinescope. When impulse noise is detected in the signal at connection 11, then output terminal 15 is connected via switch 14 to connection 13 for a predetermined period. A segment of the signal available at connection 13, generally redundant with the signal at connection 11 but unlikely to be contaminated with noise in the corresponding interval, is substituted for the impulse noise affected signal. Alternatively substitution signal may be obtained from terminal 9 in which case signal advanced with respect to the noisy defective signal is substituted therefore. The connections designated a, b, and c correspond, at least temporally, to the points designated a, b and c in FIG. 1 with the reservation that the designations a, b and c move rightward over every point in the respective line. In FIG. 2 the b signal and c signal are applied to circuitry 22 and the b signal and a signal are applied to similar circuitry 24. Circuit 22 produces an output signal related to the difference (b−c) and circuitry 24 produces an output signal related to the difference (b−a). Circuits 22 and 24 are linear signal subtractors such as unity gain differential amplifiers which are common to the circuit arts and will not be discussed further. The output signal from circuit 22 is applied to one input terminal of comparator 28. The output signal from circuit 24 is applied to comparator 32 and the signal at point b is applied to comparator 30. A substantially constant threshold or reference signal $V_T \geq \Delta R$ from signal source 41 is applied via connection 23 to respective second input terminals of comparators 28, 30 and 32 for comparison against the applied video difference signals. The amplitude $V_T$ of the threshold signal is chosen to be greater than the normal difference between nominally redundant signals with sufficient margin so as not to produce false detection signals.

Comparator 30 is included to prevent false detection due to one black horizontal line surrounded by white horizontal lines and is only employed in conjunction with the filter 18 designed to pass impulse noise signal components but not the line frequency signal of a solid horizontal black line. In light of the fact that the occurrence of a black horizontal line between two white lines is remote, comparator 30 can usually be excluded with little affect on the noise detection.

The output signals from the comparator circuits assume a "high" logic state when the variable input signals exceed the applied constant threshold signal $V_T$. The comparator output signals are applied to an AND gate 34 which produces a "high" output state at connection 25 when the three comparator output signals are simultaneously in the "high" state, and produces a "low" output state otherwise. Output signal from AND gate 34 is applied to the pulse generator 36 which generates a control signal at terminal 37 of predetermined duration and amplitude responsive to signal at its input terminal, e.g., going through a "low" to "high" transition. The control signal is applied to connection 26 either directly or via AND gate 27 and effects signal substitution by activating switch 14. Pulse generator 36, for example, may be a retriggerable monostable multivibrator which produces an output pulse of duration in the range of 1–2 microseconds.

An ancillary circuit 39 is included in the FIG. 2 detector circuit to preclude signal substitution unless impulse noise is detected in the vertical interval of the composite video signal. If impulse noise is detected during the vertical blanking interval the signal environment is presumed to be noisy and the substitution switch is operable for one or more succeeding field frame periods. If no noise is detected in the particular vertical blanking interval, no signal will be substituted in the immediately following field/frame even if subsequent noise is detected.

The threshold level $V_T$ is a function of the permissible level of false noise detection. However, if the signal is determined to be noisy, false detection becomes less important, and a lower threshold level can be utilized. During vertical blanking the composite video signal is at a generally constant level permitting application of a low noise threshold without incurring false detection therein. Thus circuitry 39 in general permits use of a lower noise threshold since the substitution circuit will be operable on video components of the composite signal only after the signal environment has been determined to be noisy.

Circuit 39 comprises AND gate 33 and a retriggerable monostable (ONE SHOT) 29. Noise detection pulses from the output terminal 37 are applied to one input terminal of AND gate 33 and vertical blanking pulses are applied to a second input terminal of AND gate 33 from terminal 35. When a noise pulse occurs concurrently with the vertical blanking pulse, the output potential of AND gate 33 goes through a "low" to "high" transition triggering a pulse from ONE SHOT 29. The pulse generated by ONE SHOT 29 is typically one video field/frame in duration but may be expanded to encompass a plurality of fields.

The output pulse produced by ONE SHOT 29 is applied to a second input of AND gate 27 enabling output pulses from pulse generator 36 at connection 37 to pass through AND gate 27 to connection 26 and activate signal switch 14. However, whenever the ONE SHOT 29 output signal on connection 31 is in a low state, AND gate 27 is precluded from passing noise detection signals from connection 37 to connection 26 and signal substitution by switch 14 is thereby precluded.

The function of the circuit 39 may be further expanded to enabling the AND gate 27 for the condition wherein noise is present in the horizontal blanking intervals or a combination of noise occurring in both the horizontal and vertical blanking intervals simply by logically "ORing" the vertical and horizontal blanking pulses at terminal 35.

Several comments are in order at this point which apply if the delay elements are of the sampled data type and the sampling is performed at a multiple of the chrominance subcarrier frequency. If the sampling rate is performed at three times the subcarrier frequency, picture elements on alternate lines are displaced by 60 degrees or 46.56 nanoseconds because the subcarrier exhibits a 180 degree phase difference line-to-line. One method of aligning the picture elements is to design delay element 10 with a delay period of 1 H+46.56 ns and delay element 12 with a signal delay period of 1 H−46.56 ns. Other techniques are available but they are not the object of this invention; see for example U.S. Pat. No. 3,946,432. It has been determined experimentally though, that for the three time subcarrier sampling rate, failure to align the pixels, i.e., failure to include the ±46.56 ns. delays in the 1H lines, does not appreciably affect the efficiency of noise detection or the probability of detection errors.

The impulse noise detection system is equally applicable to linear delay elements or to sampled data type delay elements. With respect to the latter category, the sampling rate may be any convenient frequency to provide for sufficient signal bandwidth. If the chosen sampling frequency results in the aforementioned misalignment of line-to-line picture elements, alignment may be accomplished by inclusion of incremental delay stages where necessary or desired.

It is also noted that color signals cannot simply be substituted from adjacent lines since there is a 180 phase difference of the chrominance signal line-to-line. One method of overcoming this difficulty is explicated in copending application Ser. No. 044,364 (now U.S. Pat. No. 4,272,785) filed June 1, 1979, entitled, "Defect Compensation for Color Television" incorporated herein by reference.

Another aspect to be considered is the time delay involved in noise detection. Circuitry 40 requires a finite time to determine the presence of noise in the signal at connection 11. Consequently, in order that the control signal at connection 26 occurs in time to substitute signal from delay line 12, it may be necessary to include added delay elements respectively between the switch 14 and connections 11 and 13. This added delay may be incorporated within the delay elements 10 and 12. It has been determined that for composite color video signals the highest noise to signal ratio occurs at approximately the 1.8 MHz frequency region of the signal spectrum (NTSC signals). It is therefore advantageous to detect noise in this spectrum. In order to select this signal spectrum for noise detection, bandpass filters 16, 18 and 20 are serially connected between the three signal terminals 9, 11 and 13 respectively. The pass band of these filters should not be designed particularly narrow in order that sufficient energy from low level noise impulses can be passed to enable detection. Experimentally it has been found that a pass band of about 1 MHz produces favorable results, permitting a choice of threshold level to permit detection of substantially all impulse noise which would produce an objectionable effect in the display.

Video peaking circuit 42 receives signal from terminal 15 and enhances the slope of signal transitions in the upper spectrum of the luminance signal, i.e., in the 2 MHz range. The amount of peaking is controlled by a D.C. potential applied to peaking circuit 42 via connection 44. The peaking control potential is selected between one of a higher and a lower potential by switch 45 Switch 45 is controlled by the enabling pulse (of duration of one or more frame periods) generated by ONE SHOT 29 on connection 31. The resistor R and capacitor C interposed between switch 45 and peaking circuit 42 slow the transitions between control potential levels on connection 44, thereby preventing any abrupt changes in peaking level which may be noticeable in the picture.

FIG. 3 illustrates one example of a voltage controlled peaking circuit comprising delay line 56, signal subtractor 51, signal adder 53 and gain controlled amplifier 52. The delay line 56 and subtraction circuit 51 form a transversal filter having an output connection 54. The signal at connection 54 is the average of the current or real time signal applied to terminal 15' and the delayed signal at connection 55. The amplitude of the transversal filter output signal is a function of the signal frequency and is determined by the delay period.

To condition the transversal filter output signal to be relatively high or peaked in a particular frequency range f, the delay line is selected to produce a delay of 1/(2f) seconds. Thus for the transversal filter circuit illustrated to produce an output signal on connection 54 which is peaked in the 2 MHz range, the appropriate delay for delay line 56 is approximately 250 nanoseconds. The reader is referred to U.S. Pat. No. 4,041,531 for further explication of transversal filters in peaking circuits.

The signal frequency components peaked or selected by the transversal filter 51–56 are amplified in gain controlled amplifier 52 then added to the delayed signal by ADDER circuit 53. ADDER circuit 53 produces an output signal at terminal 43' wherein the amplitude of signals in the 2 MHz range are enhanced relative to both lower and higher frequency signals.

The amount of gain applied to the signal available on connection 54 is determinative of the level of signal peaking occurring in the output signal at terminal 43'. The gain of amplifier 52 is controlled by the gain or peaking control potential (or current) applied to terminal 44'. For the system of FIG. 2 the peaking control potential is established at one of two levels depending upon whether or not the signal is considered noisy. For non-noisy signals the peaking control signal is determined by the user or consumer by a user accessible adjustment, i.e., a knob on the FIG. 4 potentiometer R3. When a noisy signal environment is detected the peaking control signal applied to terminal 44' is a preset potential determined to produce less peaking or even de-peaking or attenuation. Gain control amplifiers are known and will not be discussed further but see, for example, U.S. Pat. No. 4,081,836.

Figure 4:
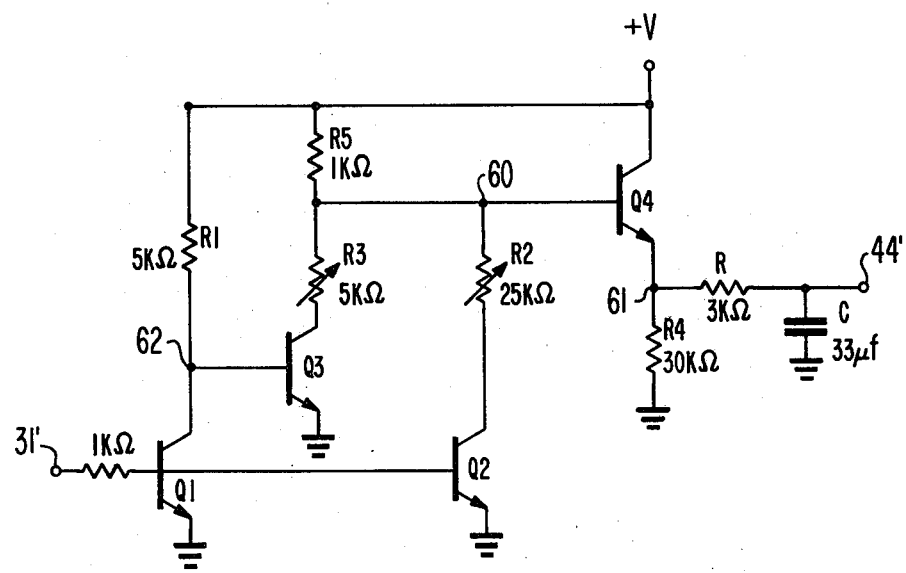
FIG. 4 is a schematic diagram for selectively generating and applying one of two control signals to the FIGS. 2 and 3 peaking circuits.

FIG. 4 is one particular circuit realization of the FIG. 2 circuit 48 for generating peaking control potentials and selectively applying such potentials to the controllable peaking circuit. A first peaking control potential V1 is generated by the series combination of resistor R5 and potentiometer R3 connected across the supply potential V+ and ground potential when transistor Q3 is conditioned to conduct (in saturation). The voltage V1 is approximately equal to (R5/(R5+R3))V+ where R5 and R3 are the resistance values respectively of resistor R5 and potentiometer R3. Similarly a second peaking control potential V2 is generated by the ratio of resistors R5 and potentiometer R2 when transistor Q2 is conditioned to conduct, i.e., V2=(R5/(R5+R2))V+. Control potentials V1 and V2 are alternatively produced at connection 60, which potentials are buffered by the emitter follower amplifier comprising transistor Q4 with its emitter load resistor R4, the buffered peaking control potential occurring at connection 61. Resistor R and capacitor C are incorporated to slow the potential transitions between V1 to V2 and vice versa occurring on output connection 44' when the circuit switches from one peaking control potential to the other.

The FIG. 4 circuit operates in the following manner. Input terminal 31' is connected to receive the enabling signal from circuit 39 (FIG. 2), i.e., the output signal of ONE SHOT 29 which is a bilevel signal going between reference or logic "low" potential and a logic "high" potential. When the potential applied to terminal 31' is low, transistors Q1 and Q2 are biased out of conduction and potentiometer R2 is effectively removed from the circuit. The collector potential of transistor Q1 (connection 62) is relatively high by virtue of resistor R1 connected between positive supply potential V+ and connection 62. Transistor Q3 having its base electrode connected to the collector electrode of transistor Q2 is thereby conditioned to conduct in saturation completing the R5-R3 series connection between V+ and ground potential and effecting the generation of peaking control potential V1.

A high potential applied to terminal 31' conditions transistors Q1 and Q2 to conduct. With Q1 in conduction its collector electrode potential is low biasing transistor Q3 out of conduction and effectively removing potentiometer R3 from the circuit. Transistor Q2 being in conduction completes the series connection of resistor R5 and potentiometer R2 between the positive supply V+ and ground potential. In this mode peaking control potential V2 is generated on connection 60.

What is claimed is:

1. A circuit combination for processing a composite video signal, comprising:
    a video signal peaking circuit responsive to said composite video signal and having a peaking control signal input terminal for applying a peaking control signal to control the degree of peaking;
    first circuit means responsive to the unpeaked composite video signal for detecting impulse noise above a threshold level in blanking intervals of said composite video signal and for generating a further control signal having a duration of at least a video field period whenever said impulse noise is detected;
    a first source of peaking control signal;
    a second source of peaking control signal; and
    second circuit means responsive to said further control signal for selectively coupling said first source of peaking control signal to said control input terminal for a duration of at least one video field period and responsive to the absence of said further control signal for coupling said second source of peaking signal to said control input terminal.

2. Video signal processing circuitry comprising:
    defect substitution circuitry for replacing defective video signal segments with video signal segments advanced or delayed in time therefrom;
    defect detection circuitry responsive to defects in said video signal for generating a switching signal to control said defect substitution circuitry;
    a video signal peaking circuit having an input terminal connected to an output terminal of said substitution circuitry, and having a peaking control input terminal, said peaking circuit being responsive to a peaking control signal for establishing the degree of peaking applied to the video signal;

first circuit means responsive to said switching signal and to video signal blanking signals for generating a further control signal when signal defects are detected during a blanking interval of said video signal, and wherein said further control signal is of at least one video field duration;

a first and second source of peaking control signal; and second circuit means responsive to said further control signal for coupling said first source of peaking control signal to said peaking control input terminal for at least one video field period, and for coupling said second source of peaking control signal to said peaking control input terminal in the absence of said further control signal.

3. The video signal processing circuitry set forth in claim 2 wherein the peaking circuit comprises:

a signal delay element having an input terminal connected to said signal substitution circuit and having an output terminal;

an signal subtracting circuit having first and second input terminals respectively connected to the signal delay element input and output terminals, and having an output terminal;

a gain controlled amplifier having a signal input terminal connected to said signal subtracting circuit output terminal, a gain control signal terminal for applying said peaking control signals thereto, and having an output terminal; and a signal adding circuit having first and second input terminals respectively connected to said delay element and said amplifier output terminals, and having an output terminal at which peaked video signal is available.

4. The video signal processing circuitry set forth in claim 1 or 2 wherein said second circuit means and the first and second sources of peaking control signal comprise:

a source of supply potential, and a reference potential;

a first resistor having a first end connected to said supply potential, and having a second end;

first and second resistive means having respective first terminals connected to the second end of said first resistor, and having respective second ends;

first and second switch means, said first switch means connecting the second end of said first resistive means to reference potential only when the further control signal is present and said second switch means connecting the second end of said second resistive means to reference potential only when said further control signal is not present; and means for connecting the interconnection of the first resistor and the first and second resistive means to the control signal input terminal of said peaking circuit.

5. The video signal processing circuit set forth in claim 4 wherein the means connecting the interconnection of the first resistor and the first and second resistive means to said peaking circuit comprises;

a buffer amplifier having an input terminal connected to said interconnection and having an ouput terminal, said amplifier having a low output impedance;

a second resistor having first and second ends connected respectively to buffer amplifier output terminal and the peaking circuit control signal input terminal; and a capacitor connected between the second end of the second resistor and a point of fixed potential, said second resistor and said capacitor limiting the rate of potential transitions occurring at said peaking circuit control signal input terminal due to potential transitions produced at said buffer amplifier output terminal.

6. The video signal processing circuitry set forth in claim 4 wherein the first and second switch means comprise:

an inverting amplifier having an input terminal connected for receiving said enabling signal and having an output terminal;

first and second transistors having respective first and respective second electrodes with respective principal conduction paths therebetween, and having respective control electrodes, the first electrodes of said first and second transistors respectively connected to the second ends of the first and second resistive means, the second electrodes of said first and second transistors respectively connected to reference potential, and having their respective control electrodes connected to the input and output terminals of said inverting amplifier.

7. The video signal processing circuit set forth in claim 3 wherein the first circuit means comprises; a two input logic AND gate having a first input responsive to composite video signal blanking pulses and having a second input responsive to said signal defect detection circuitry, and having an output terminal; and a monostable multivibrator responsive to potential transitions occurring at the output terminal of said logic AND circuit for generating said further control signals of predetermined amplitude and duration.

* * * * *